Figure 1:
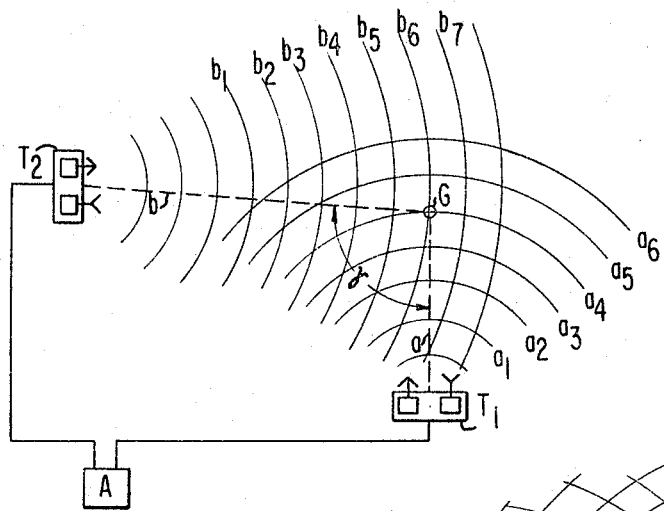

June 6, 1967  U. KNEPPER  3,324,468
METHOD AND APPARATUS FOR DETERMINING THE ACCURACY
OF PROJECTILES FIRED AT A TARGET
Filed May 10, 1965

INVENTOR
UDO KNEPPER
BY *James E. Bryan*
ATTORNEY

# United States Patent Office 3,324,468
Patented June 6, 1967

3,324,468
METHOD AND APPARATUS FOR DETERMINING THE ACCURACY OF PROJECTILES FIRED AT A TARGET
Udo Knepper, Kressbronn, Germany, assignor to Dornier System G.m.b.H., a limited-liability corporation of Germany
Filed May 10, 1965, Ser. No. 454,598
Claims priority, application Germany, Aug. 27, 1964, D 45,285
7 Claims. (Cl. 343—12)

This invention relates to a method and apparatus for instantaneously determining the number of hits on or the distances by which projectiles miss a target at which they are fired and is particularly applicable to high velocity projectiles fired at a target which is either fixed or movable on the surface of the earth, although the target also may be one which is airborne if desired.

In copending application Ser. No. 454,597, filed May 10, 1965, a non-cooperative measuring method and apparatus is disclosed, i.e., a method and apparatus in which no auxiliary means, tracing means, or the like are provided in the projectile, which satisfies as universally as possible all of the requirements to be met by a hit-indicating device. The apparatus disclosed in the copending application, supra, operates independently of the size of the bullet or other projectile, and the velocity thereof, with a very high degree of accuracy. The accuracy is obtained by employing waves of at least two frequencies which are emitted by transmitting devices mounted in the target and which, after reflection from a bullet or other projectile, are picked up by receiving devices in the target with a frequency shift corresponding to the velocity of the projectile, as a result of the Doppler effect. A differential frequency is formed in each case in the receiving devices from frequencies directly transmitted thereto by the transmitting devices and from the respectively coordinated reflected frequencies. The phase difference between the differential frequencies is determined and converted into a value representative of the distance of the bullet or other projectile from the target.

The method and apparatus of the copending application, supra, is particularly suitable for determining hits or near misses in cases where a target is fired at from all sides, particularly when the firing is at a towed airborne target in which case only the number of hits or the distance by which the projectiles miss the target is of importance and the direction of the projectiles is of only minor interest.

There are, however, instances in which conventional two-dimensional target discs are employed in gunnery practice and in which the direction of hit deviation is important. In the disc targets heretofore employed, an instantaneous evaluation of the hits, i.e., the target pattern, was not possible and, instead, the target had to be observed and the distance of the hits from the center thereof measured individually.

The present invention eliminates the aforementioned disadvantages and provides an improvement on the method and apparatus described in the copending application, supra, such that it is possible to obtain a rapid indication of the number of hits on, or near misses of projectiles relative to, a target in those cases where the direction of hit deviation is also important. In the present invention, a comparative evaluation is made of the results of at least two separate, individually operable, hit-determining systems which are positioned outside of the target. By means of the distances measured by each of the hit-determining systems, the precise location of the point of penetration of the projectile in the target is obtained. The hit-determining systems are preferably disposed essentially at 90° with respect to each other, with reference to the center of the target, and in a plane which is assumed to extend through the target transversely to the primary direction of firing. In this manner, an imaginary electronic disc is obtained.

Figure 2A:
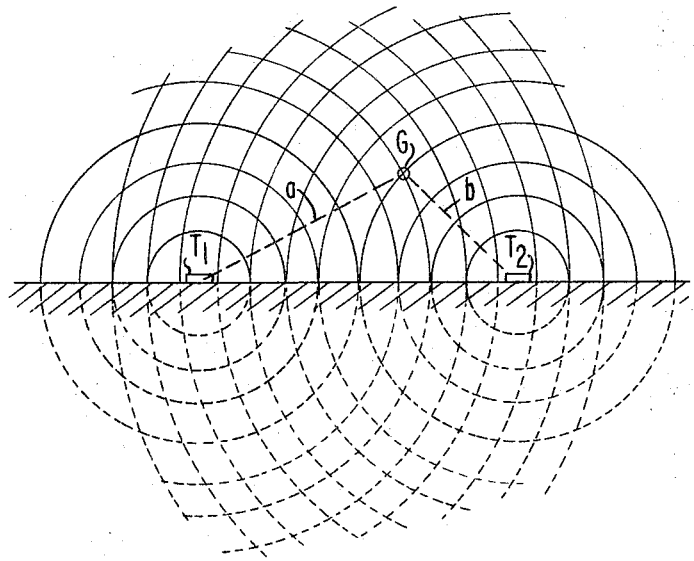
Figure 2B:
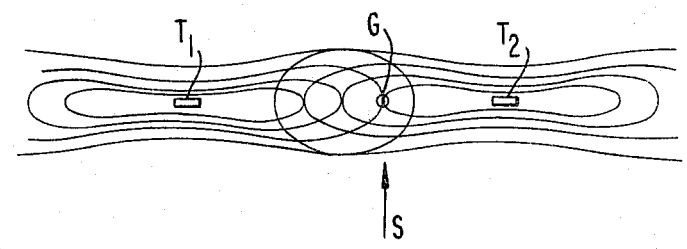
Figure 3:
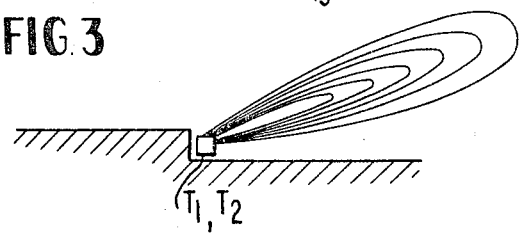

The invention will be further illustrated by reference to the accompanying drawings in which FIGURE 1 is a schematic illustration of one embodiment of the apparatus of the present invention, FIGURE 2a shows another embodiment of the apparatus of FIGURE 1 in which special transmitting antennas are employed and is a view in the direction of firing, FIGURE 2b is a view of the embodiment of FIGURE 2a at a right angle to the direction of fire, and FIGURE 3 is a further embodiment of the apparatus of the invention in which the plane of radiation of the transmitting antennas is essentially parallel to the surface of the earth.

Referring to FIGURE 1, two separate, individually operable, hit-determining systems $T_1$ and $T_2$ are shown, each of which operates in accordance with the disclosure of the copending application, supra, i.e., they radiate waves in at least two frequencies which are reflected by a projectile and picked up again in receivers with a frequency shift as a result of the Doppler effect. A differential frequency is formed in each case from these modified frequencies and from the original frequencies. The distance of the projectile from the target is determined from the two resulting differential frequencies by phase comparison. In FIGURE 1, a distance $a$ from the projectile G will result for the hit-determining system $T_1$ and, analogously, a distance $b$ for the hit-determining system $T_2$. The two distances are shown in dashed lines. These two distance lines form the angle $\gamma$ with each other. It is evident that the most favorable measuring results are obtained if the angle $\gamma$ is approximately 90°. The reference symbols $a_1$ to $a_6$ in FIGURE 1 define concentric spaced distance circles around the hit-determining system, $T_1$, and reference symbols $b_1$ to $b_7$ identify concentric circles around the hit-determining system $T_2$. The location of the point of penetration of the projectile is determined exactly by the point of intersection of the measured distance circles. The distance values obtained are transmitted from the two hit-determining systems to a common evaluating device A in which the precise position of the hit is determined from the point of intersection of the distance circles. It is possible in this manner to clearly and precisely determine not only the distance of the projectile from the center of the target but also the direction of hit deviation of the projectile as it penetrates the target.

In FIGURES 2a and 2b, special transmitting antennas are employed for the frequencies emitted by the hit-determining systems. Antennas having a fan-like directional characteristic are employed for this purpose and the plane of the radiations is essentially transverse to the line of fire. FIGURE 2a shows the radiations when viewed in the direction of firing, and FIGURE 2b illustrates the embodiment of FIGURE 2a viewed at a right angle to the line of fire. FIGURE 2b makes the fan-like radiation characteristic of the antenna apparent. Compared to antenna arrangements having a spherical characteristic, the arrangement of FIGURES 2a and 2b has the significant advantage that in cases where projectiles penetrate diagonally through the imaginary electronic disc, only minor deviations or variations in the indication thereof will be produced.

Here again, the reference symbols $T_1$ and $T_2$ have been employed to indicate the hit-determining systems, G identifies the projectile, and S is the line of fire. It is clearly visible from this arrangement that an imaginary electronic disc may be represented as described above. The arrangement according to FIGURE 2 is not limited to use on solid ground, i.e., the systems $T_1$ and $T_2$ need not be mounted in a stationary manner but also may be made movable with respect to the surface of the earth. Thus, it is possible to mount the two systems $T_1$ and $T_2$ so that they may be towed across land or water. This has the advantage that no large target frames need be towed but, instead, only the small and light hit-determining systems need be transported. Since the imaginary disc is not optically visible, any customary expedient may be employed as a target for a marksman or an observer. For example, the target may be represented optically by means of a light or by means of a smoke signal from one of the systems $T_1$ and $T_2$, respectively. Also, it is possible to represent the target by means of electronic instruments and to obtain, in this case, a magnification of the target by augmentation and the like.

The distance circles of the hit-determining systems $T_1$ and $T_2$ have been indicated as semicircles in FIGURE 2a. Accordingly, they indicate the conditions in the case of a disc which either rests on the ground or floats on water. This arrangement, of course, also may be employed for airborne targets and the two hit-determining systems $T_1$ and $T_2$ may be mounted in a towed aricraft. In this case, the full circles shown in dashed lines are obtained as the distance circles.

In the embodiment of FIGURE 3, transmitting antennas having a fan-like directional characteristic also are employed. The hit-determining systems are so mounted in this embodiment that the plane of radiation of the transmitting antennas is flat and essentially parallel to the surface of the earth. FIGURE 3 shows this arrangement in a lateral view. The two hit-determining systems $T_1$ and $T_2$ are mounted in series and are protected, if desired, against direct hits by an embankment or a wall. The direction or line of fire is defined by the reference characteristic S and it extends essentially at a right angle to the plane of radiation of the directional antennas. An electronic disc for high-angle firing and air-to-ground fire, respectively, may be represented in this manner. It is possible, in this case, to obtain a perfect adaptation relative to the respective direction of firing by means of a flat or inclined position, respectively, of the radiating surface of the antenna. This arrangement also affords the great advantage that an instantaneous and exact indication of the hits is obtained in a simple manner. The heretofore employed obliquely mounted partial discs which were set up consecutively in offset or staggered fashion and which were complicated both with respect to the construction and the observation thereof, are completely eliminated.

It will be obvious to those skilled in the art that many modifications may be made within the scope of the present invention without departing from the spirit thereof, and the invention includes all such modifications.

What is claimed is:

1. In a method of determining the hits or missing distances, respectively, of projectiles fired at a target which comprises
 (a) emitting electromagnetic radiations in at least two frequencies from a plurality of transmitters,
 (b) receiving the radiations in receivers, after reflection from a projectile, with a frequency shift corresponding to the velocity of the projectile as a result of the Doppler effect,
 (c) forming differential frequencies in the receivers from frequencies transmitted directly thereto by the transmitters and from coordinate reflected frequencies,
 (d) determining the phase difference between the differential frequencies, and
 (e) converting said phase difference into a value representative of the distance of the projectile from the target, the improvement which comprises obtaining and evaluating results from at least two separate, individually operable hit-determining systems positioned outside of the target.

2. A method according to claim 1 in which the separate, hit-determining systems are at substantially 90° with respect to each other, with reference to the center of the target, in a plane assumed to extend through the target transversely to the primary firing direction.

3. A method according to claim 1 in which the radiations are emitted in a plane essentially parallel to the surface of the earth.

4. In an apparatus for determining the hits or missing distances, respectively, of projectiles fired at a target which comprises
 (a) means for transmitting electromagnetic radiations in at least two frequencies,
 (b) means for receiving the radiations, after reflection from a projectile, with a frequency shift corresponding to the velocity of the projectile as a result of the Doppler effect,
 (c) means for forming differential frequencies in the receivers from frequencies transmitted directly thereto by the transmitters and from coordinate reflected frequencies,
 (d) means for determining the phase difference between the differential frequencies, and
 (e) means for converting said phase difference into a value representative of the distance of the projectile from the target, the improvement which comprises at least two separate, individually operable hit-determining systems positioned outside of the target and being connected to a common evaluation means.

5. An apparatus according to claim 4 in which the separate, hit-determining systems are mounted at substantially 90° with respect to each other, with reference to the center of the target, in a plane assumed to extend through the target transversely to the primary firing direction.

6. An apparatus according to claim 4 including transmitting antenna means having fan-like directional characteristics and being positioned essentially transversely to the direction of firing.

7. An apparatus according to claim 6 including means whereby the transmitting antenna means radiate in a plane essentially parallel to the surface of the earth.

References Cited

UNITED STATES PATENTS

| | | | |
|---|---|---|---|
| 3,029,426 | 4/1962 | Robinson | 343—12 |
| 3,140,488 | 7/1964 | Girault | 343—12 |
| 3,168,735 | 2/1965 | Cartwright | 343—14 X |

RODNEY D. BENNETT, *Primary Examiner.*

CHESTER L. JUSTUS, *Examiner.*

J. P. MORRIS, *Assistant Examiner.*